Aug. 4, 1931. C. H. VYSE 1,817,280
COMBUSTION CHAMBER FOR MOTORS
Filed March 17, 1930   3 Sheets-Sheet 2

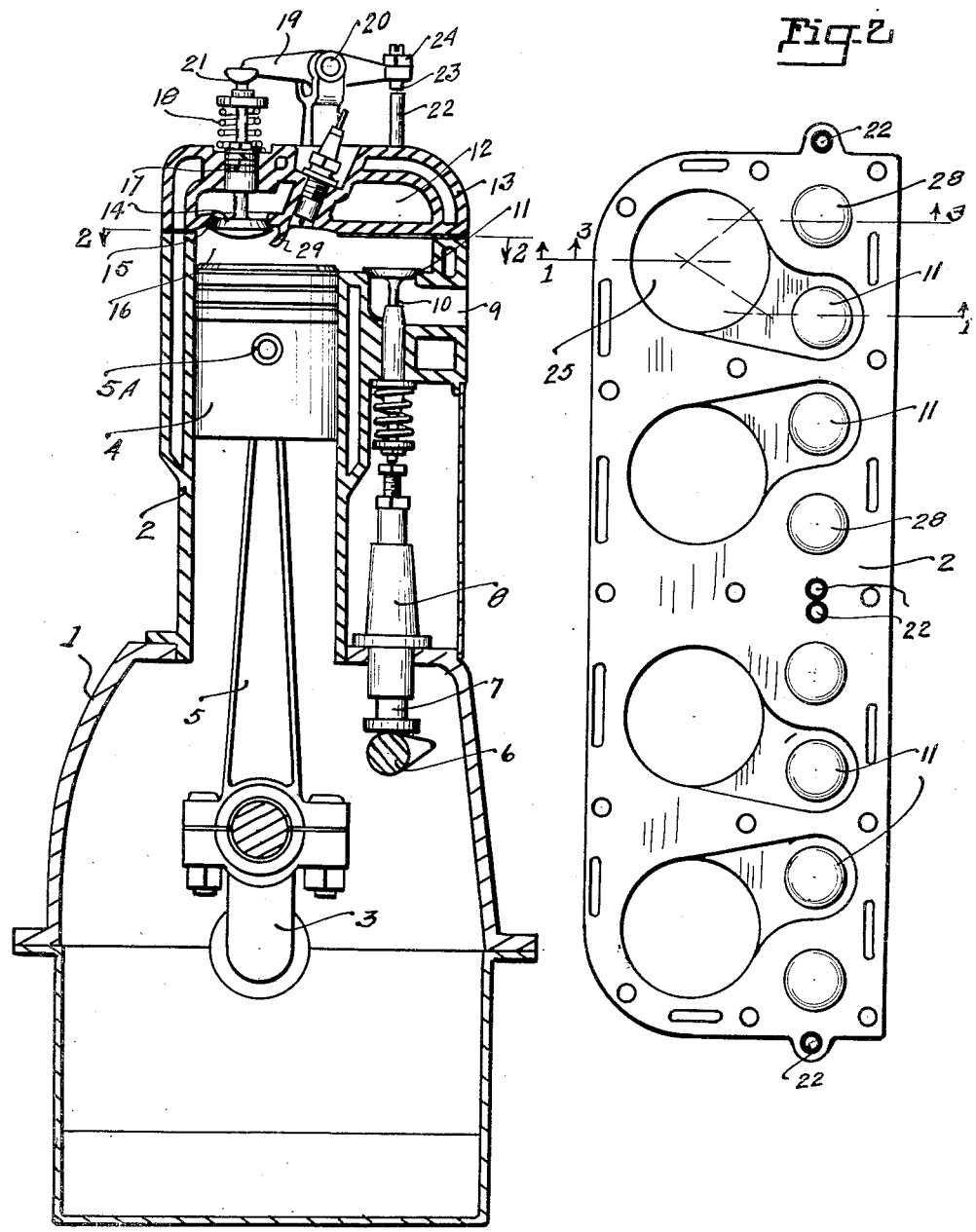

Inventor
Charles Henry Vyse
Attorney

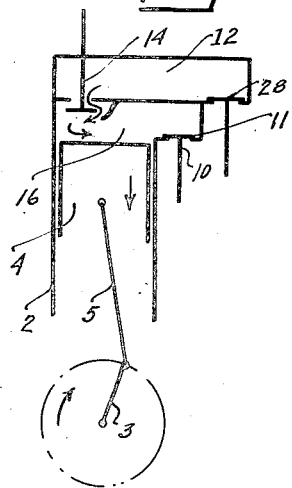
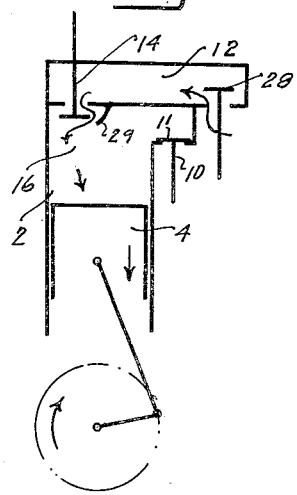
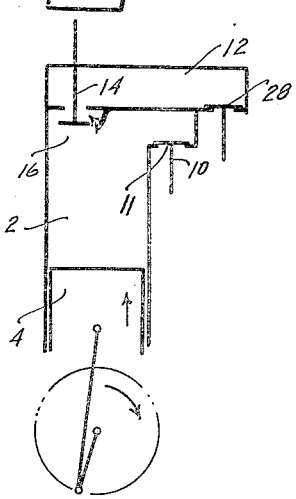
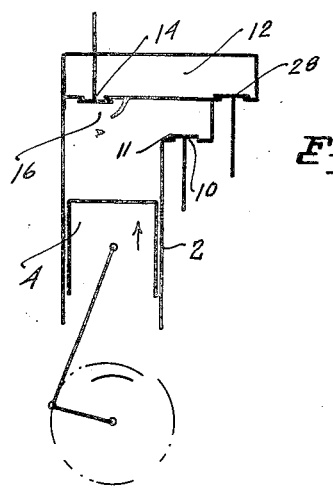
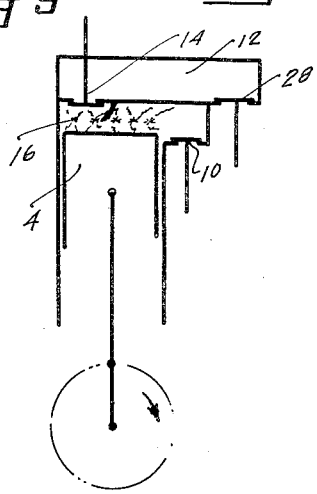
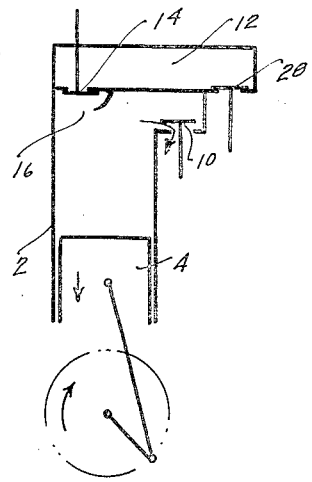
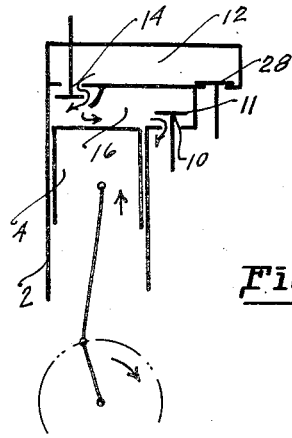
Charles Henry Vyse
Inventor Patented Aug. 4, 1931

1,817,280

UNITED STATES PATENT OFFICE

CHARLES HENRY VYSE, OF PORTLAND, OREGON

COMBUSTION CHAMBER FOR MOTORS

Application filed March 17, 1930. Serial No. 436,486.

My invention is primarily intended for use in internal combustion engines using hydro-carbon fuels. The invention in its preferred embodiment consists in providing one or more cylinders arranged parallelly with each other and each cylinder having a reciprocating piston disposed therein. The prime mover being what is known as of the four-cycle type. A crank is mounted within the base of the motor with the usual crank and piston rod being disposed between the crank and the piston. A removable head is provided for each of the cylinders with an inlet and an exhaust port provided in the usual manner. I provide a reservoir in the cylinder head adapted for storing a substantial part of the fuel charge, for each cycle of operation, under compression therein, with a cam actuated inlet valve being disposed between the storage reservoir and the firing cylinder with means for opening the valve at a predetermined point in the travel of the piston to admit the compressed fuel charge into the cylinder at a predetermined point of the travel of the piston.

The primary purpose and object of my invention is to increase the operating efficiency of the prime mover and to thereby develop a larger unit of power per unit of combustible material used than is generally accomplished in prime movers of this class.

A further object of my invention consists in providing new, novel and useful means for aiding in the scavenging of the spent fuel charge remaining in the cylinder at the completion of the exhaust stroke.

A further object of my invention consists in providing simple and efficient means for predetermining the amount, of quality, of the fuel charge to be burned in each operating cycle within each of the cylinders.

A still further object of my invention consists in providing a simplified construction for regulating the conditions that will be maintained within the firing cylinder during the admittance of a new fuel charge therein and the exhausting of the spent fuel charge therefrom.

With these and incidental objects in view, the invention consists in certain novel features of construction and combination of parts, the essential elements of which are set forth in the appended claim, and a preferred form of embodiment of which is hereinafter shown with reference to the drawings which accompany and form a part of this specification.

In the drawings:

Fig. 1 is a longitudinal, sectional, front view of an internal combustion prime mover having my new and improved construction embodied therein.

Fig. 2 is a sectional, plan view of the assembled device here shown as a four-cycle motor, the same being taken on line 2—2 of Fig. 1, looking in the direction indicated.

Fig. 6 is a diagrammatical layout of a new and improved engine embodying my construction. In this view the piston is shown just as the same has passed its high point in its cycle of operation.

Fig. 7 is a diagrammatical layout of the same form of construction and illustrating the inlet valve disposed between the operating cylinder and the carburetor and the inlet valve disposed between the cylinder and the storage reservoir, both being open to admit of the direct passage of carbureted fuel being admitted both into the storage reservoir and the operating cylinder.

Fig. 8 is a diagrammatical layout of the mechanism illustrated in Fig. 7 and illustrating the piston just as the same has passed its extreme low point and illustrating the valves in preferred position for this position of the piston.

Fig. 9 is a diagrammatical layout of the mechanism illustrated in the other diagrammatical layouts and illustrating all valves closed.

Fig. 10 is a diagrammatical layout illustrating the piston in its high point of the firing stroke of the piston.

Fig. 11 is a diagrammatical layout of the associated elements and illustrating the exhaust port from the operating cylinder as having been opened.

Fig. 12 is a diagrammatical layout of the associated elements and illustrating the piston approaching the high point of its exhaust stroke and illustrating the inlet valve disposed between the operating cylinder and the reservoir as having been opened to aid in the scavenging operation.

Like reference characters refer to like parts throughout the several views.

Figure 3:
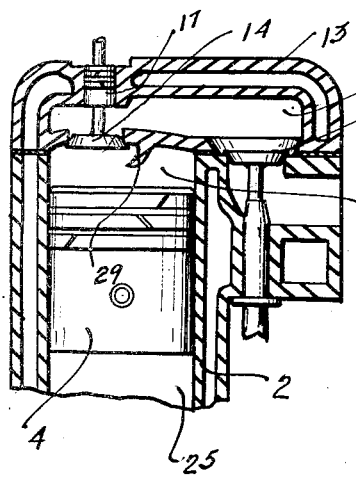
Fig. 3 is a fragmentary, sectional, side view of the head and the upper portion of the cylinder block, the same being taken on line 3—3 of Fig. 2, in reference to the block, looking in the direction indicated. In this view the inlet port is shown closed.

My invention in its preferred embodiment consists of a crank case 1 and having a removable cylinder block 2 removably secured to the crank case by any suitable fastening means. A crank 3 is mounted within the crank case and is rotatably disposed therein. Pistons 4 are reciprocably disposed within the cylinders with a piston rod 5 disposed between the crank 3 and the pistons 4. A wrist pin 5A in usual form connects the piston rod to the piston. The cam shaft 6 is disposed within the crank case with the cam actuated valve stem 7 being supported within a suitable bearing 8 of the cylinder block. An exhaust port 9 is disposed through the cylinder wall with the exhaust valve 10 being disposed within the exhaust port. The valve 10 being seated upon the diaphragm 11. The exhaust valve 10 is adapted for being cam actuated by the valve stem 7 leading from the cam shaft 6. A reservoir is provided within the cylinder head 13. An inlet valve 14 is seated within the diaphragm 15 that is disposed between the operating cylinder 16 and the storage reservoir 12. The valve 14 passes outward through the upper end of the cylinder head and a proper working relationship is maintained between the valve stem and the cylinder head.

Figure 4:
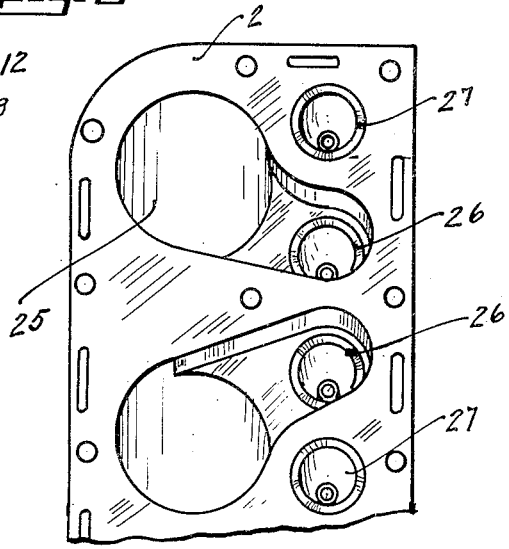
Fig. 4 is a fragmentary, perspective, plan view of the cylinder block, the same being made to illustrate two cylinders with the valve ports associated therewith.
Figure 5:
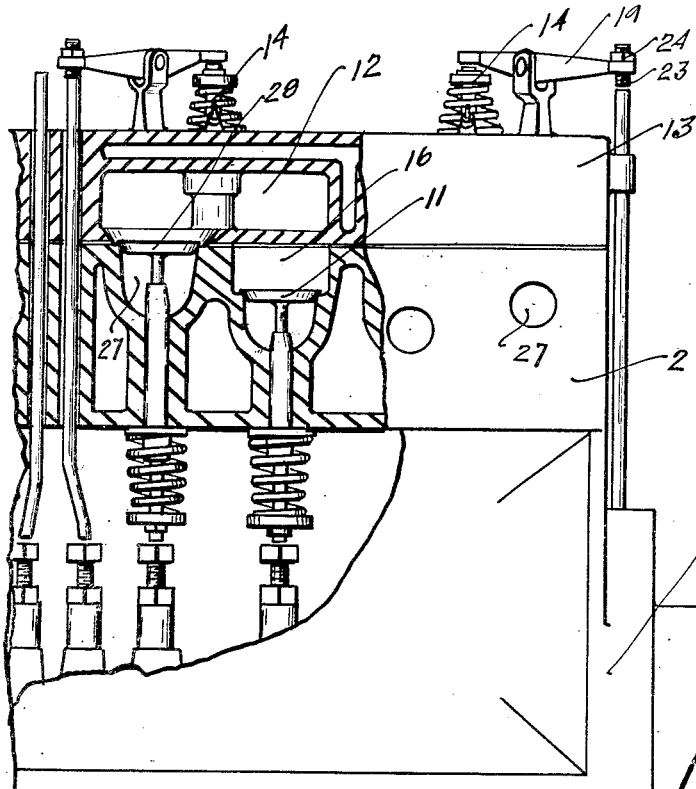
Fig. 5 is a side view, partially in section, of one of my new and improved engines, the same being made to illustrate the valve ports disposed therein.

I have found splendid results may be obtained wherein a piston 17 is disposed about the valve stem with piston rings being disposed thereupon to provide a proper working relationship and to prevent undue escapement of the compressed fuel charge being maintained within the reservoir 12 during a part of the operating cycle. A spring 18 normally maintains the valve 14 seated upon its diaphragm seat 15. A rocker arm 19 is rockably disposed upon a suitable supporting pin 20. One end of the rocker arm is in registerable engagement with the upper end 21 of the valve stem. The oppositely disposed end of the rocker arm is adjustably positioned upon the actuating push rod 22. A proper adjustment being maintained by the adjusting screw 23 that is threadably disposed upon the oppositely disposed end of the rocker arm 19. A lock nut 24 maintains a proper working relationship between the push rod 22 and the rocker arm 19. The exhaust port leading from the operating cylinder is best illustrated in Fig. 4 wherein the channelway leading from the operating cylinder 25 is inclined downward substantially within the cylinder block leading to the exhaust valve 26. The full passageway leading from the carburetor passes through the inlet valve 27 and through the cylinder head, as illustrated at 28, and leads into the storage reservoir 12.

In the operating cycle of my new and improved automotive engine, the total fuel charge disposed between the carburetor and the operating cylinder is compressed, both within the firing cylinder and within the storage reservoir 12, and when the compression has reached the required amount the inlet valve 14 is closed and a part of the compressed fuel charge is maintained within the storage reservoir 12 until the piston reaches the position of its exhaust as illustrated in Fig. 12 at which time the exhaust valve leading from the operating cylinder is opened, at which time the compressed fuel charge, disposed between the reservoir 12 and the operating cylinder, is permitted to pass through the valve 14 into the firing cylinder. A baffle 29 being disposed downward from the cylinder head to diffuse the inrushing compressed fuel charge in its initial stages of entry into the operating cylinder to thereby aid in the exhausting of the spent gases yet remaining within the operating cylinder. This admitting of an initially compressed fuel charge into the operating cylinder, at the completion of the exhaust stroke, speeds up the exhaust operation from the operating cylinder at the time when the piston has reached the point of its travel of least usefulness in the further exhausting of the spent fuel charge. The admitting of a momentum to the fuel charge under compression by flowing into the operating cylinder gives an added impulse to the incoming fuel charge from the carburetor and also speeds it up in its operation to thereby give freer handling of the entire fuel charge both from the carburetor and from the storage reservoir disposed within the cylinder head of the prime mover.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows.

What I claim is:

In a device of the class described, the combination of a cylinder, a piston reciprocably disposed within the cylinder, means for reciprocating the piston, a cylinder head having a fuel storage reservoir disposed therein adapted for maintaining a fuel charge under compression therein, a pair of valves disposed within the cylinder head and between the carburetor and the operating cylinder, one of which admits fuel from the inlet manifold into the storage reservoir, the other of which admits compressed fuel from the storage reservoir into the operating cylinder, an exhaust valve leading through the cylinder wall from the cylinder, and a baffle downwardly extending from the cylinder head into the operating cylinder and adjacent the valve disposed between the storage reservoir and the operating cylinder.

CHARLES HENRY VYSE.